(12) United States Patent
Pan

(10) Patent No.: US 8,996,651 B2
(45) Date of Patent: Mar. 31, 2015

(54) SYSTEM AND METHOD FOR DELIVERING MEDIA ASSETS IN A CLOUD ENVIRONMENT

(76) Inventor: Yang Pan, Singapore (SG)

( * ) Notice: Subject to any disclaimer, the term of this patent is extended or adjusted under 35 U.S.C. 154(b) by 393 days.

(21) Appl. No.: 13/295,043

(22) Filed: Nov. 12, 2011

(65) Prior Publication Data

US 2013/0124672 A1 May 16, 2013

(51) Int. Cl.
*G06F 15/16* (2006.01)
*H04N 21/214* (2011.01)
*H04N 21/258* (2011.01)
*H04N 21/2747* (2011.01)
*H04N 21/414* (2011.01)
*H04N 21/475* (2011.01)
*H04N 21/478* (2011.01)
*H04N 21/482* (2011.01)
*H04N 21/84* (2011.01)

(52) U.S. Cl.
CPC ....... *H04N 21/214* (2013.01); *H04N 21/25875* (2013.01); *H04N 21/2747* (2013.01); *H04N 21/41407* (2013.01); *H04N 21/4753* (2013.01); *H04N 21/47805* (2013.01); *H04N 21/482* (2013.01); *H04N 21/84* (2013.01)
USPC ............ 709/217; 709/201; 709/202; 709/203

(58) Field of Classification Search
USPC .................................. 709/217, 201, 202, 203
See application file for complete search history.

(56) References Cited

U.S. PATENT DOCUMENTS

| 7,636,764 | B1 | 12/2009 | Fein et al. |
| 7,987,262 | B2 | 7/2011 | Tung et al. |
| 8,265,935 | B2 * | 9/2012 | Krig ............................... 704/270 |
| 8,521,904 | B1 * | 8/2013 | Pei et al. ....................... 709/238 |
| 2003/0211896 | A1 * | 11/2003 | Wang et al. ..................... 472/59 |
| 2008/0077638 | A1 | 3/2008 | Monk et al. |
| 2010/0191783 | A1 | 7/2010 | Mason et al. |
| 2010/0332479 | A1 | 12/2010 | Prahlad et al. |
| 2010/0333116 | A1 | 12/2010 | Prahlad et al. |
| 2011/0022642 | A1 | 1/2011 | demilo et al. |
| 2011/0055161 | A1 | 3/2011 | Wolfe |
| 2011/0078375 | A1 | 3/2011 | Shepherd et al. |
| 2011/0167435 | A1 | 7/2011 | Fang |
| 2011/0295661 | A1 * | 12/2011 | Dodge et al. ................. 705/14.4 |
| 2012/0087634 | A1 * | 4/2012 | Lalwaney ..................... 386/241 |
| 2012/0239661 | A1 * | 9/2012 | Giblin ........................... 707/741 |
| 2012/0303944 | A1 * | 11/2012 | Peng et al. ....................... 713/2 |
| 2013/0007618 | A1 * | 1/2013 | Dodson et al. ................ 715/716 |
| 2013/0024880 | A1 * | 1/2013 | Moloney-Egnatios et al. . 725/14 |
| 2013/0073388 | A1 * | 3/2013 | Heath ....................... 705/14.53 |
| 2013/0080578 | A1 * | 3/2013 | Murad et al. .................. 709/217 |

* cited by examiner

*Primary Examiner* — Lan-Dai T Truong

(57) ABSTRACT

A media delivery system comprises a handheld computing and communication device, a media delivery unit and a user specific media library in a cloud. A data file including metadata of the media assets in the media library is stored in the handheld device. The handheld device and the media delivery unit are connected through a wireless communication link. A user of the handheld device is identified. A user selected media asset may be delivered by the media delivery unit by receiving the media asset through the cloud.

20 Claims, 3 Drawing Sheets

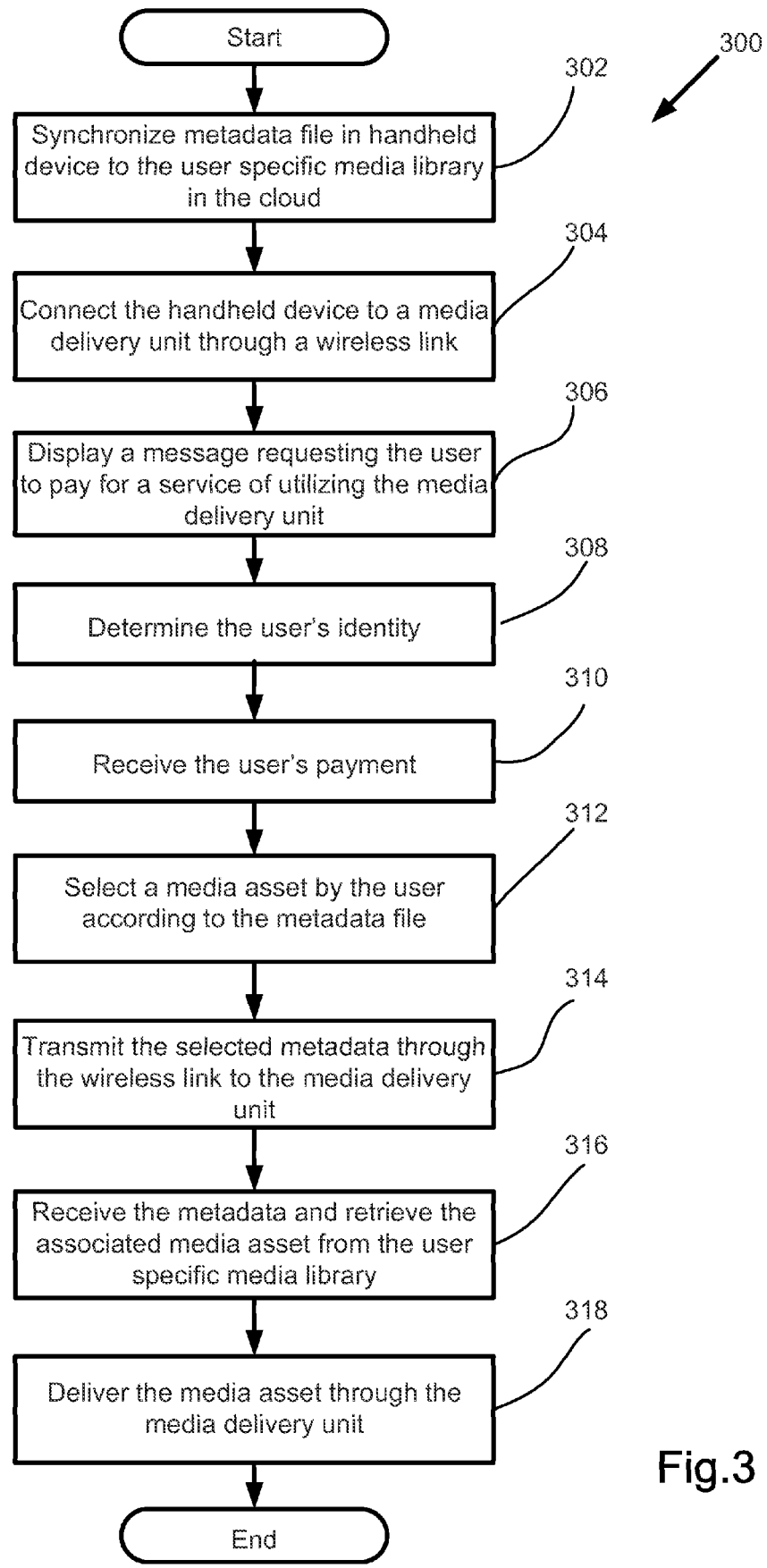

SYSTEM AND METHOD FOR DELIVERING MEDIA ASSETS IN A CLOUD ENVIRONMENT

CROSS-REFERENCE TO RELATED APPLICATIONS

Not applicable.

BACKGROUND

1. Field of Invention

This invention relates generally to a media delivery system. More specifically, the invention describes a system and method for delivering media assets in a cloud environment.

2. Description of Prior Art

Cloud computing provides computation, software, data access, and storage services that do not require end-user knowledge of the physical location and configuration of the system that delivers the services. Cloud computing describes a new supplement, consumption, and delivery model for IT services based on Internet protocols, and it typically involves provisioning of dynamically scalable and often virtualized resources. It is a byproduct and consequence of the ease-of-access to remote computing sites provided by the Internet. Cloud computing providers deliver applications via the Internet, which are accessed from various personal devices, while the business software and data are stored on servers at a remote location. Most cloud computing infrastructures consist of services delivered through shared data-centers and appearing as a single point of access for consumers' computing needs. Data files can be stored in a cloud that is accessible by a personal device when the device is connected to the Internet.

Systems and methods for accessing the data, in particularly media assets stored in the cloud environment are clearly needed.

SUMMARY OF THE INVENTION

It is an objective of the present disclosure to provide a system and method for delivering media assets stored in the cloud through different types of media delivery units.

An exemplary media delivery system comprises a handheld computing and communication device, such as for example, a smart phone. The system further comprises a user specific media library stored in the cloud. A data file stored in a file storage system of the handheld device includes metadata of the media assets in the media library. After the handheld device and a media delivery unit are connected through a wireless communication link, the user's identity is determined. A user selects a media asset through a user interface of the handheld device. The metadata of the selected media asset is transmitted to the media delivery unit through the wireless link. The media delivery system connected to the cloud receives the metadata and retrieves the associated media asset from the media library and delivers the asset.

BRIEF DESCRIPTION OF THE DRAWINGS

For a more complete understanding of the present invention and its various embodiments, and the advantages thereof, reference is now made to the following description taken in conjunction with the accompanying drawings, in which:

FIG. 3 is a flowchart illustrating the operation of the system according to the second embodiment.

DETAILED DESCRIPTION

References will now be made in detail to a few embodiments of the invention, examples of which are illustrated in the accompanying drawings. While the invention will be described in conjunction with the particular embodiments, it will be understood that it is not intended to limit the invention to the described embodiments. To the contrary, it is intended to cover alternatives, modifications, and equivalents as may be included within the spirit and scope of invention as defined by the appended claims.

Figure 1:
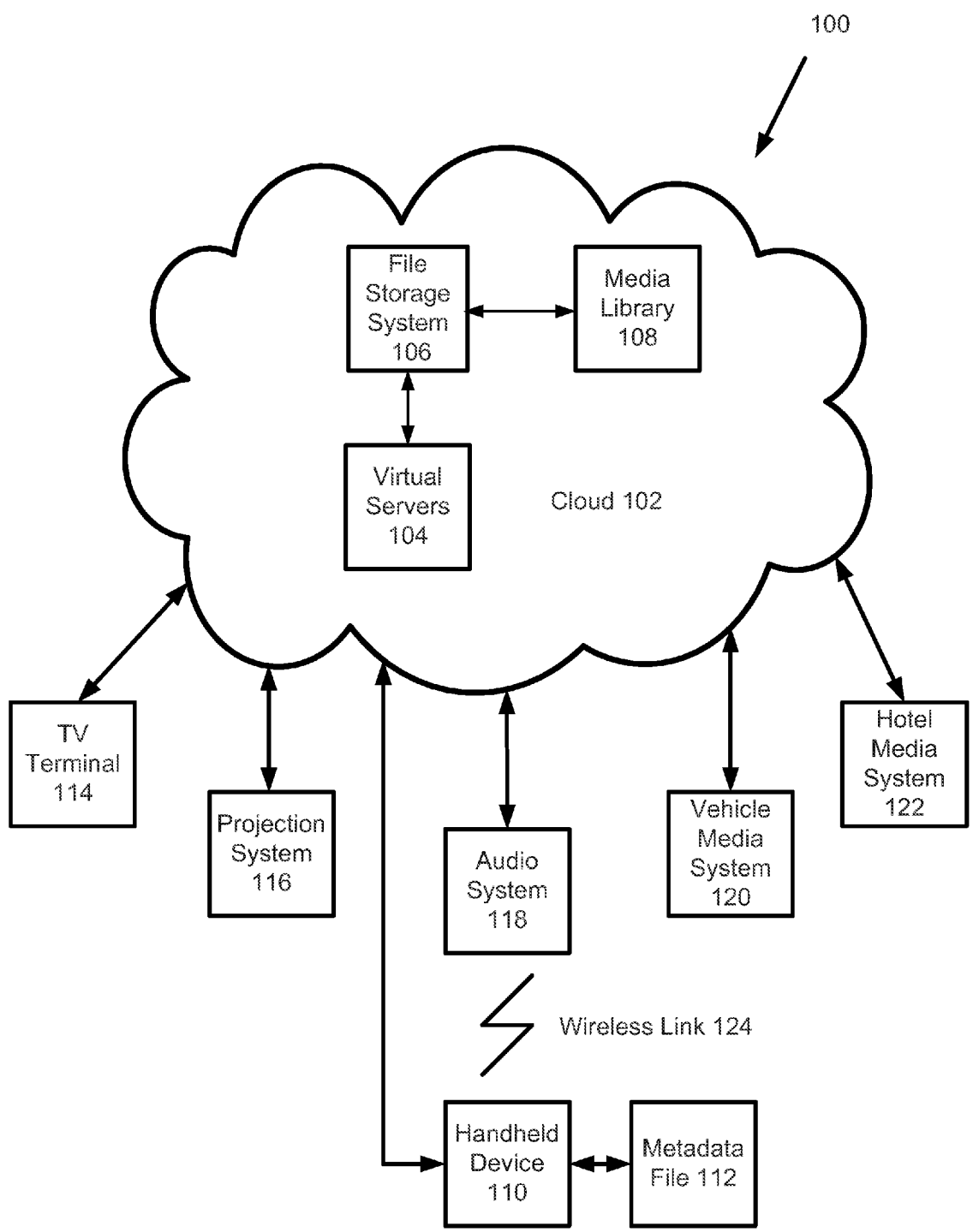
FIG. 1 is a schematic diagram illustrating an exemplary media delivery system in a cloud environment.

FIG. 1 is a schematic diagram illustrating an exemplary media delivery system in the cloud environment. The exemplary system 100 comprises a network or a cloud 102. The term "cloud" and "network" will be used indifferently in the present disclosure. The cloud 102 may be the Internet. Data files may be stored in a file storage system 106 of virtual servers 104 that are generally hosted by third parties, rather than being hosted on dedicated servers. Hosting companies operate large data centers; and users who require their data files to be hosted buy or lease storage capacity. A media library 108 is stored in the file storage system 106. The media library 108 may comprise a large number of media assets including but not limiting to video, audio, multimedia, text, photo and image files.

The system 100 further comprises a handheld computing and communication device 110. The handheld device 110 may include but not limit to a media player, a mobile phone, a tablet computer, a laptop computer, a game console and a digital camera. The handheld device 110 includes a metadata file 112 stored in a file storage system of the handheld device. The metadata file 112 includes the metadata of the media assets in the user specific media library. When the handheld device 110 is connected to the cloud 102, a program stored in the device 110 controls an operation that the metadata in the file 112 is synchronized to the media assets stored in the media library 108. The program may be executed in a predetermined frequency. The program may also be executed whenever there is a change in media assets stored in the media library 108. It should be noted that the media assets in the media library 108 are not required to be stored in the handheld device 110 although it is possible that all of or part of the media assets are also stored in the handheld device 110. The metadata is descriptive for the media assets. The metadata may include titles and authors of the media assets.

The system 100 further comprises one or multiple media delivery units. In an exemplary case, the media delivery system includes but not limits to a TV terminal 114 including a set top box, a projection system 116 including a projector, an audio system 118, a vehicle system 120 and a hotel media system 122. The vehicle system 120 may be an automobile media system. The vehicle system 120 may also be an airplane media system. The airplane media system may include a TV terminal in front of a passenger's seat. The hotel media system 122 may include a TV terminal and a set top box. The media delivery units are connectable exemplarily to the cloud 102 through wired or wireless broadband connections.

The handheld device 110 and anyone of the media delivery units may be connected through a wireless communication link 124. The wireless link 124 comprises an ad hoc communication link including Bluetooth, ZigBee, WiFi and Near Field Communication (NFC) type of wireless communication links. The wireless communication link 124 may also be an optical communication link that employs visible or invisible light beams.

A user of the media delivery system 100 may select a media asset through a user interface of the handheld device 110. The user interface may be a hierarchical user interface that is based on the metadata of the media assets organized in a hierarchical manner. The user interface may also be a search engine. Upon the user's selection, the selected metadata is transmitted to the connected media delivery unit through the wireless communication link 124. The media delivery unit receives the metadata and initiates an operation to retrieve the associated media asset from the media library 108 in the cloud 102. The media delivery unit delivers the media asset to the user upon receiving the media asset from the cloud 102.

Figure 2:
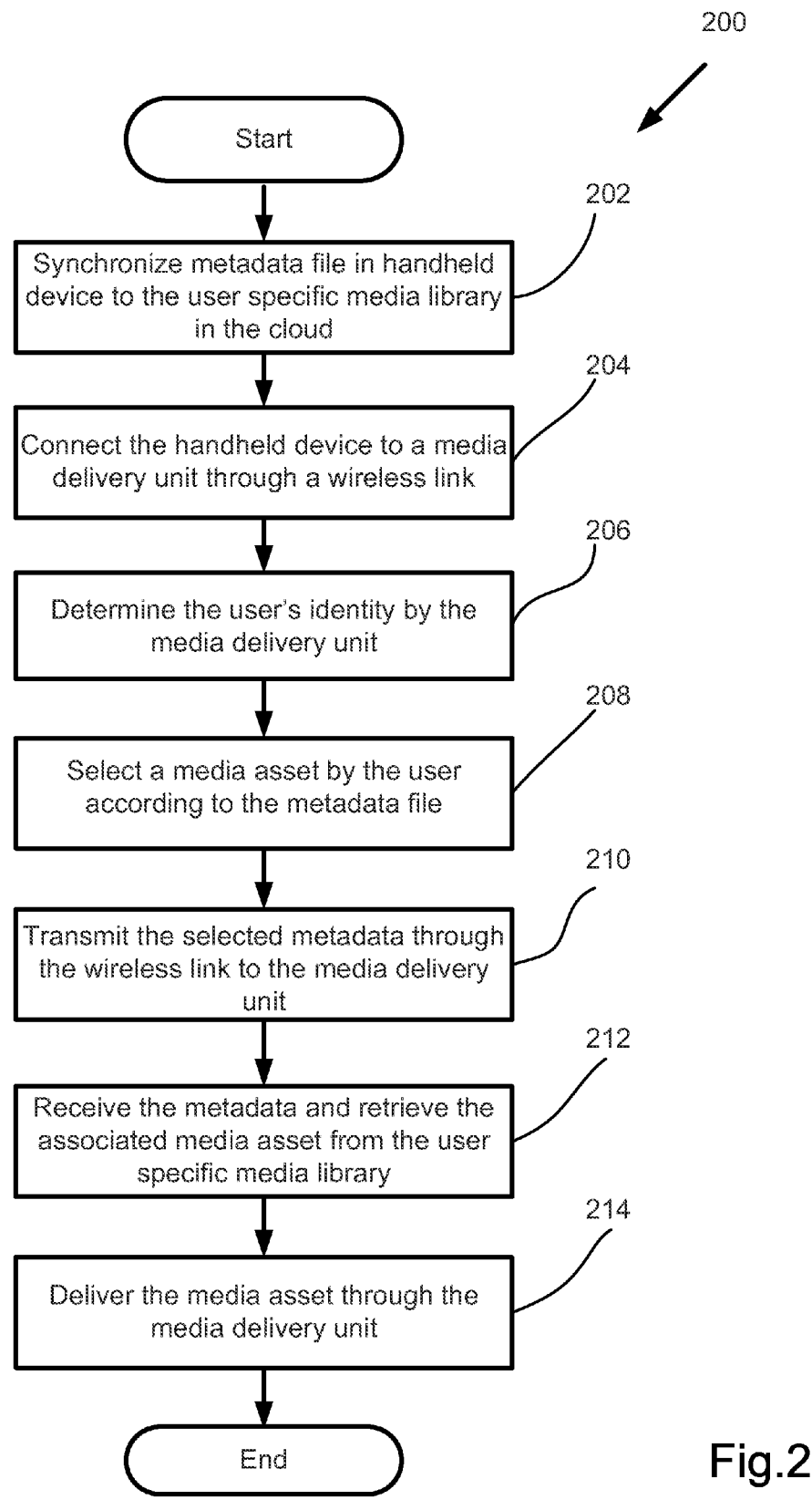
FIG. 2 is a flowchart illustrating the operation of the system according to the first embodiment.

FIG. 2 is a flowchart illustrating the operation of the system 100 according to the first embodiment of the present invention. Process 200 begins with a step that metadata file 112 and the media library 108 is synchronized in a manner that metadata in the file 112 represents all media assets in the media library 108 (202). The step of synchronization may be initiated and be controlled by a program stored either in the handheld device 110 or in the cloud 102. The synchronization may be executed in a predetermined frequency according to one implementation. The synchronization may be executed each time after the handheld device 110 is connected to the cloud 102. The synchronization may also be executed whenever there is a change in the media assets stored in the media library 108.

The handheld device 110 and a media delivery unit are connected through a wireless communication link 124 (204). In an exemplary case, the handheld device 110 may be connected to a TV terminal 114 through a Bluetooth type of connection. The identity of the user of the handheld device 110 is determined (206). Methods of determining the identity of a user is well established in the art. In an exemplary case, upon the connection, the TV terminal 114 displays a display window requesting the user to key in a user name and a password. The display window may also be displayed on a display screen of the handheld device 110 in an alternative implementation.

After the user's identity is determined, the user specific media library is accessible by the media delivery unit through the cloud 102. A media asset for delivering using the media delivery unit is selected by the user through the user interface of the handheld device 110 (208). The metadata is subsequently transmitted to the media delivery unit through the wireless link 124 (210). The metadata is received by the media delivery unit and the associated media asset in the media library 108 is retrieved by a processor in the media delivery unit (212). The media asset is sent to the media delivery unit and is delivered by the media delivery unit (214). In the exemplary case, the TV terminal 114 is used as the media delivery unit. A video asset in the media library 108 is retrieved and is received by the TV terminal 114 and is streamed through the terminal subsequently. The set top box may be employed for the delivering the user selected video asset.

FIG. 3 is a flowchart illustrating the operation of the system 100 according to the second embodiment. Media delivery units, such as for example, TV terminals may be installed in public areas such as in airport terminals. A user may employ the TV terminals to deliver video assets stored in the cloud 102 through the handheld device 110. The user may need to pay a fee for such a service. The TV terminal may also be installed in front of a user's seat in an airplane. The user may use the handheld device to access video assets stored in the cloud 102 during a flight if the airplane is connected to the cloud 102.

Process 300 begins with a step that metadata file 112 and the media library 108 is synchronized in a manner that metadata in the file 112 represents all media assets in the media library 108 (302). The handheld device 110 and a media delivery unit are connected through a wireless communication link 124 (304). In an exemplary case, the handheld device 110 may be connected to a TV terminal 114 through a Bluetooth type of connection. Upon the connection is established, a message is displayed either on a display screen of the media delivery unit or on a display screen of the handheld device 110 requesting the user to pay a fee in order to use a service of delivering a media asset from the user specific media library in the cloud 102 (306). The user voluntarily discloses his or her identity to the media delivery unit. The identity of the user of the handheld device 110 is determined (308). Methods of determining the identity of a user is well established in the art. In an exemplary case, upon the connection, the TV terminal displays a display window requesting the user to key in a user name and a password. The display window may also be displayed on a display screen of the handheld device 110 in an alternative implementation. The media delivery unit receives the user's payment through an on-line agent in an exemplary case (310).

After the user's identity is determined and the payment is received, the user specific media library is accessible by the media delivery unit through the cloud 102. A media asset for delivering using the media delivery unit is selected by the user through the user interface of the handheld device 110 (312). The metadata is subsequently transmitted to the media delivery unit through the wireless link 124 (314). The metadata is received by the media delivery unit and the associated media asset in the media library 108 is retrieved by a processor in the media delivery unit (316). The media asset is sent to the media delivery unit and is delivered by the media delivery unit (318). In the exemplary case, the TV terminal 114 is used as the media delivery unit. A video asset in the media library 108 is retrieved and is received by the TV terminal 114 and is streamed through the TV terminal subsequently. The set top box may be employed for the delivering the user selected video asset.

The invention claimed is:

1. A media delivering system comprising:
   (a) a user specific media library including a plurality of media assets stored in a cloud;
   (b) a handheld computing and communication device comprising a data file including metadata representing said plurality of media assets, said metadata is updated in accordance with said user specific media library in a predetermined frequency;
   (c) a television terminal connected to the cloud; and
   (d) an ad hoc wireless communication link that connects said handheld device and said television terminal,
       wherein a media asset stored in said user specific library in the cloud is delivered through the following steps, comprising:
       (i) selecting metadata of a media asset displayed on said handheld device by a user through a user interface of said handheld device;
       (ii) transmitting selected metadata through the ad hoc communication link to said television terminal;
       (iii) retrieving by said television terminal the media asset based on received metadata from said user specific media library in the cloud; and (iv) rendering the media asset using said television terminal.

2. The media delivery system as recited in claim 1, wherein said system further comprising a means of identifying the user by said television terminal.

3. The media delivery system as recited in claim 2, wherein said means of identifying the user further comprising displaying a display window on said television terminal requesting the user to key in user name and a password.

4. The media delivery system as recited in claim 1, wherein said handheld device is a mobile phone.

5. The media delivery system as recited in claim 1, wherein said handheld device is a tablet computer.

6. The media delivery system as recited in claim 1, wherein said handheld device is a media player.

7. The media delivery system as recited in claim 1, wherein said ad hoc communication link further comprising a Bluetooth type of connection.

8. The media delivery system as recited in claim 1, wherein said ad hoc communication link further comprising a Near Field Communication type of connection.

9. The system as recited in claim 1, wherein said wireless communication link further comprising a visible or invisible light beam communication link.

10. A media delivering system comprising:
    (a) a user specific media library including a plurality of media assets stored in a cloud;
    (b) a handheld computing and communication device comprising a data file including metadata representing said plurality of media assets, said metadata is updated in accordance with said user specific media library in a predetermined frequency;
    (c) a vehicle media system connected to the cloud; and
    (d) an ad hoc wireless communication link that connects said handheld device and said vehicle media system,
        wherein a media asset stored in said user specific library in the cloud is delivered through the following steps, comprising:
        (i) selecting metadata of a media asset displayed on said handheld device by a user through a user interface of said handheld device;
        (ii) transmitting selected metadata through the ad hoc communication link to said vehicle media system;
        (iii) retrieving by said vehicle media system the media asset based on received metadata from said user specific media library in the cloud; and
        (iv) rendering the media asset using said vehicle media system.

11. The media delivery system as recited in claim 10, wherein said vehicle media delivery system further comprising an automobile media delivery system.

12. The media delivery system as recited in claim 10, wherein said vehicle media delivery system further comprising an airplane media delivery system.

13. The media delivery system as recited in claim 10, wherein said system further comprising a means of identifying the user by said vehicle media system.

14. The media delivery system as recited in claim 13, wherein said means of identifying the user further comprising displaying a display window on a display of said vehicle media system requesting the user to key in user name and a password.

15. The media delivery system as recited in claim 10, wherein said ad hoc communication link further comprising a Bluetooth type of connection.

16. The media delivery system as recited in claim 10, wherein said ad hoc communication link further comprising a Near Field Communication type of connection.

17. A media delivering system comprising:
    (a) a user specific media library including a plurality of media assets stored in a cloud;
    (b) a handheld computing and communication device comprising a data file including metadata representing said plurality of media assets, said metadata is updated in accordance with said user specific media library in a predetermined frequency;
    (c) a television terminal located in a public area connected to the cloud; and
    (d) an ad hoc wireless communication link that connects said handheld device of a user and said television terminal,
        wherein a media asset stored in said user specific library in the cloud is delivered through the following steps, comprising:
        (i) connecting said television terminal in the public area and said handheld device through an ad hoc wireless communication link;
        (ii) determining the user's identity by said television terminal;
        (iii) displaying a message on said television terminal requesting the user to pay for a service of utilizing said television terminal;
        (iv) paying for the service by the user by using of said handheld device through the ad hoc wireless communication link;
        (v) selecting metadata of a media asset displayed on said handheld device by a user through a user interface of said handheld device;
        (vi) transmitting selected metadata through the ad hoc communication link to said television terminal;
        (vii) retrieving by said television terminal the media asset based on received metadata from said user specific media library in the cloud; and
        (viii) rendering the media asset using said television terminal.

18. The media delivery system as recited in claim 17, wherein said method of paying for the service further comprising paying for the service by the user through an on-line agent.

19. The media delivery system as recited in claim 17, wherein said ad hoc communication link further comprising a Bluetooth type of connection.

20. The media delivery system as recited in claim 17, wherein said ad hoc communication link further comprising a Near Field Communication type of connection.

* * * * *